United States Patent
Yasuie et al.

(10) Patent No.: US 7,545,750 B2
(45) Date of Patent: Jun. 9, 2009

(54) APPARATUS AND METHOD FOR DETECTING NETWORK FAILURE

(75) Inventors: Takeshi Yasuie, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 640 days.

(21) Appl. No.: 11/229,689

(22) Filed: Sep. 20, 2005

(65) Prior Publication Data

US 2006/0285487 A1    Dec. 21, 2006

(30) Foreign Application Priority Data

Jun. 20, 2005  (JP)  ............................. 2005-179294

(51) Int. Cl.
*H04J 1/16*  (2006.01)

(52) U.S. Cl. ................... 370/242; 370/235; 370/244; 370/252

(58) Field of Classification Search ............ 370/235, 370/236, 236.1, 236.2, 252, 241, 237, 242, 370/250, 245; 709/238, 239, 242, 244

See application file for complete search history.

(56) References Cited

U.S. PATENT DOCUMENTS 6,836,462 B1 *  12/2004  Albert et al. ................ 370/235
2005/0099949 A1 *  5/2005  Mohan et al. ............ 370/236.2

FOREIGN PATENT DOCUMENTS

JP    2001-197114    7/2001
JP    2004-360305    12/2004

* cited by examiner

*Primary Examiner*—Ricky Ngo
*Assistant Examiner*—Dady Chery
(74) *Attorney, Agent, or Firm*—Staas & Halsey LLP

(57) ABSTRACT

The network failure detection apparatus is realized as a function of a terminal in a network. The network failure detection apparatus acquires packet reception statistic information on a port-by-port basis of a relay unit, and extracts a port having a large amount of packet reception per unit time. When there is one port having a large reception amount in a certain relay unit, the network failure detection apparatus decides that the L2 (layer 2) loop is occurred in the downstream direction of the port concerned. Also, when there are two ports having a large reception amount in a certain relay unit, the network failure detection apparatus decides that a loop is formed at the relevant two ports, in which the L2 loop is occurred.

16 Claims, 18 Drawing Sheets

FIG. 7

A THRESHOLD FOR DECIDING AN L2 LOOP = 80Mbps

SW1 STATIC INFORMATION

| PORT NUMBER | 1 | 2 | 3 |
|---|---|---|---|
| REFERENCE VALUE [Mbyte] | 5 | 10 | 15 |
| INCREASED VALUE [Mbyte] | 17 | 12 | 16 |
| DIFFERENCE VALUE [Mbyte] (INCREASED VALUE − REFERENCE VALUE) | 12 | 2 | 1 |
| RECEIVED DATA AMOUNT PER UNIT TIME [Mbps] | 96 | 16 | 8 |

FIG. 8

A THRESHOLD FOR DECIDING AN L2 LOOP = 80Mbps

SW2 STATIC INFORMATION

| PORT NUMBER | 1 | 2 | 3 | 4 |
|---|---|---|---|---|
| REFERENCE VALUE [Mbyte] | 5 | 10 | 15 | 15 |
| INCREASED VALUE [Mbyte] | 17 | 12 | 36 | 15 |
| DIFFERENCE VALUE [Mbyte] (INCREASED VALUE – REFERENCE VALUE) | 12 | 2 | 11 | 0 |
| RECEIVED DATA AMOUNT PER UNIT TIME [Mbps] | 96 | 16 | 88 | 0 |

FIG. 10

SW_1 STATIC INFORMATION

| PORT NUMBER | 1 | 2 | 3 |
|---|---|---|---|
| REFERENCE VALUE [Mbyte] | 5 | 10 | 15 |
| INCREASED VALUE [Mbyte] | 17 | 10 | 18 |
| DIFFERENCE VALUE [Mbyte] (INCREASED VALUE − REFERENCE VALUE) | 12 | 0 | 3 |
| RECEIVED DATA AMOUNT PER UNIT TIME [Mbps] | 96 | 0 | 24 |

MAXIMUM VALUE OF RECEIVED DATA AMOUNT= 96 Mbps

THRESHOLD = MAXIMUM VALUE OF RECEIVED DATA AMOUNT 96Mbps
* CONSTANT MULTIPLYING FACTOR 0.8 = 76.8Mbps
(MINIMUM THRESHOLD = 8Mbps)

FIG. 11

SW2 STATIC INFORMATION

| PORT NUMBER | 1 | 2 | 3 | 4 |
|---|---|---|---|---|
| REFERENCE VALUE [Mbyte] | 5 | 10 | 15 | 15 |
| INCREASED VALUE [Mbyte] | 17 | 13 | 36 | 15 |
| DIFFERENCE VALUE [Mbyte] (INCREASED VALUE – REFERENCE VALUE) | 12 | 3 | 11 | 0 |
| RECEIVED DATA AMOUNT PER UNIT TIME [Mbps] | 96 | 24 | 88 | 0 |

MAXIMUM VALUE OF RECEIVED DATA AMOUNT = 96 Mbps

THRESHOLD = MAXIMUM VALUE OF RECEIVED DATA AMOUNT 96Mbps * CONSTANT MULTIPLYING FACTOR 0.8 = 76.8Mbps
(MINIMUM THRESHOLD = 8Mbps)

FIG. 13

A THRESHOLD FOR DECIDING AN L2 LOOP = 8000 pps

SW1 STATIC INFORMATION

| PORT NUMBER | 1 | 2 | 3 |
|---|---|---|---|
| REFERENCE VALUE | 1000 | 500 | 600 |
| INCREASED VALUE | 12000 | 550 | 620 |
| DIFFERENCE VALUE (INCREASED VALUE − REFERENCE VALUE) | 11000 | 50 | 20 |
| RECEIVED DATA AMOUNT PER UNIT TIME [pps] | 11000 | 50 | 20 |

FIG. 14

A THRESHOLD FOR DECIDING AN L2 LOOP = 8000 pps

SW2 STATIC INFORMATION

| PORT NUMBER | 1 | 2 | 3 | 4 |
|---|---|---|---|---|
| REFERENCE VALUE | 1000 | 500 | 2000 | 100 |
| INCREASED VALUE | 12000 | 550 | 14000 | 130 |
| DIFFERENCE VALUE (INCREASED VALUE − REFERENCE VALUE) | 11000 | 50 | 12000 | 30 |
| RECEIVED DATA AMOUNT PER UNIT TIME [pps] | 11000 | 16 | 12000 | 30 |

FIG. 17A

IF TYPE TABLE ethernet-csmacd(6)
fastEther(62)
fastEtherFX(69)
gigabitEthernet(117)

FIG. 17B f : fastEthernet
g : gigabitEthernet

| PORT NUMBER | 1 | 2 | 3 | 4 | 5 | 6 | 7 | 8 | 9 | 10 |
|---|---|---|---|---|---|---|---|---|---|---|
| If Type | f | f | f | f | f | f | g | g | ATM | ATM |

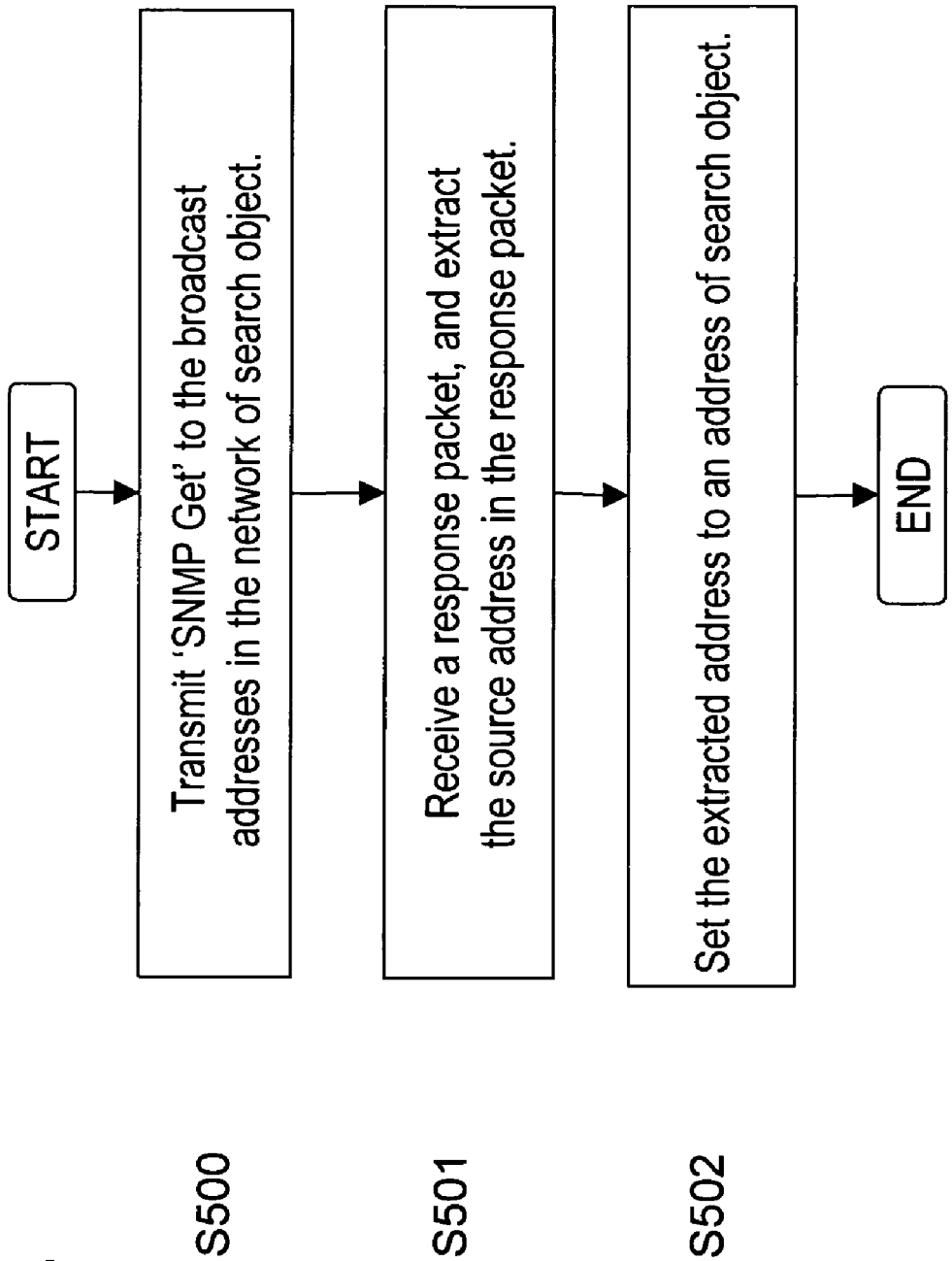

APPARATUS AND METHOD FOR DETECTING NETWORK FAILURE

CROSS-REFERENCE TO RELATED APPLICATIONS

This application is based upon and claims the benefit of priority from the prior Japanese Patent Application No.2005-179294 filed on Jun. 20, 2005, the entire contents of which are incorporated herein by reference.

BACKGROUND OF THE INVENTION

1. Field of the Invention

The present invention relates to a network failure detection apparatus and a network failure detection method for detecting a failure occurred in a network, and more particularly a network failure detection apparatus and a network failure detection method for detecting a layer-2 loop, a failure occurred in a relay unit constituting the network.

2. Description of the Related Art

A relay unit, which is referred to as layer 2 (L2) switch constituting a network such as LAN, is a kind of network relay unit having a function of transferring packets after determining the destinations from data in the data link layer (the second layer) of the OSI reference model. The data link layer protocol includes MAC (media access control) in Ethernet, etc., and an Ethernet relay unit determining the destination of the data by referring to a MAC address is also referred to as switching hub. Since protocols such as IP, TCP and HTTP are placed in the network layer (the third layer) or higher, the layer-2 switch can transfer packets even when the protocols in the third layer or higher are different.

In a network in which a plurality of terminals are connected through the layer-2 switches, a failure called 'layer 2 loop' possibly occurs throughout the entire network area caused by an incorrect cable connection, a fault in the layer-2 switch, etc. The occurrence of the layer 2 loop produces high load conditions in the terminals throughout the entire network area, and brings about a disabled condition of network communication.

FIGS. 1 through 3 show explanation diagrams of the network failure caused by the layer 2 loop (hereafter referred to as 'L2 loop'). In FIG. 1, the network has the following configuration: In subordination to a 'layer-2 switch' (hereafter simply referred to as 'switch') SW1, switches SW2, SW3 and SW4 are connected to the network. Further, switches SW5, SW6 and SW7 are connected subordinate to the switches SW2, SW3 and SW4, respectively. Terminals Y1, Y2 and X are then connected to the switches SW5, SW6 and SW7, respectively. In the above network configuration, it is assumed that a loop connection is formed in the switch SW2 due to incorrect cable connection in the switch SW2, resulting in the occurrence of an L2 loop at this point.

Now, an example such that the terminal X transmits a broadcast packet will be explained hereafter. When the broadcast packet is transmitted from the terminal X, the broadcast packet reaches the switch SW2, having the loop occurred therein, via the switches SW7, SW4 and SW1. Each time the broadcast packet is circulated in the loop occurred in the switch SW2, the broadcast packet is transmitted throughout the entire area of the network (subnet). Because such the loop circulation is performed at a wire speed, the result is that the broadcast packet continues to be transmitted throughout the entire network from the switch SW2 at wire speed (which is referred to as 'broadcast storm'), and the terminals in the network fall into heavy load conditions.

Also, when the broadcast packet is input to one of the plurality of ports in each switch, the switch stores the MAC address of the originating terminal included in the broadcast packet. The switch then recognizes the direction, in which the originating terminal of the broadcast packet is existent, to be the direction of the input port in regard to the originating terminal of interest (hereafter, the above recognition may also be represented as 'learning the address'). Accordingly, as a result of the above broadcast storm, there emerges a switch in which 'incorrect learning' (hereafter referred to as 'mislearning') of the originating terminal address is made. Namely, because each switch recognizes the source address of the broadcast packet to be located in the direction of the point of the L2 loop occurrence (i.e. the switch SW2) the address mislearning of the originating terminal is brought about in the respective switches which are located on the path between the terminal X and the point of the L2 loop occurrence. More specifically, the address of the terminal X is learned as if the terminal X transmitting the broadcast packet exists in the switch SW2 in which the L2 loop is occurred, as a virtual image of the terminal X. Therefore, in the figure, the switches SW7, SW4, SW1 and SW2, which are located on the path between the terminal X and the point of the L2 loop occurrence, mislearn the address of the terminal X. As such, in a state of the L2 loop being occurred, when a broadcast packet is transmitted from a terminal, switches located on a path between the terminal concerned and the point of the occurrence of the L2 loop mislearn the terminal address concerned.

In regard to the switches SW3, SW5 and SW6, no such mislearning occurs, which is merely because a packet reception direction in case of a packet transmitted from the actual terminal X happens to coincide with a packet reception direction in case of a packet transmitted from the point of the L2 loop occurrence.

As described above, in the state of mislearning the address of the terminal X, the terminal Y1 transmits a unicast packet to the terminal X, as shown in FIG. 2. The unicast packet reaches the switch SW2 via the switch SW5. Since the switch SW2 has mislearned the address of the terminal X, the unicast packet continues to circulate in the L2 loop occurred in the switch SW2. As a result, the unicast packet does not reach the terminal X, and the communication between the terminal Y1 and the terminal X becomes not possible. Also, the switch SW2 mislearns the address of the terminal Y1 as if the terminal Y1 is existent in the L2 loop. As such, when a unicast packet is transmitted to an address which has been mislearned so as to reach a point of occurrence of the L2 loop, in the switch SW2 having the L2 loop occurred therein, the address of the originating terminal of the unicast packet is mislearned to be located in the direction of the L2 loop. Here, another switch SW5 correctly learns the address of the terminal Y1.

Similarly, as shown in FIG. 3, in the state that the address of the terminal X is mislearned as described above, the terminal Y2 transmits a unicast packet to the terminal X. The unicast packet reaches the switch SW2 via the switches SW6, SW3 and SW1. The switch SW2 has mislearned the address of the terminal X, and the unicast packet continues to circulate in the L2 loop occurred in the switch SW2. As a result, the unicast packet does not reach the terminal X, and the communication with the terminal X becomes not possible. Also, the switch SW2 mislearns the address of the terminal Y2, as if the terminal Y2 is existent in the L2 loop. Here, other switches SW6, SW3 and SW1 correctly learn the address of the terminal Y2.

As a technique for detecting such the L2 loop which causes a network failure, for example, in the official gazette of the Japanese Unexamined Patent Publication No. 2001-197114, an L2 loop detection method, in which an infinite loop is determined by analyzing a receiving frame, is disclosed.

When the L2 loop occurs, conventionally, localization of the occurred L2 loop point has been made by manually ejecting and inserting cables of the layer-2 switch, or by repeating an information acquisition procedure related to the connection condition of the switch being suspected of the failure. Accordingly, a substantially long time (a few hours to a few days) and a large amount of work have been required before finding out the L2 loop point.

Further, according to the technique disclosed in the above official gazette of the Japanese Unexamined Patent Publication No. 2001-197114, it is possible to detect the occurrence of the L2 loop somewhere in the network (subnetwork or subnet). However, it is not possible to identify an exact point of the L2 loop in the subnet.

SUMMARY OF THE INVENTION

Accordingly, it is an object of the present invention to provide a network failure detection apparatus and a network failure detection method, capable of detecting the occurrence of an L2 loop and the point thereof easily and promptly.

As a first configuration of the network failure detection apparatus according to the present invention to achieve the above-mentioned object, in the network failure detection apparatus, which is a first terminal among a plurality of terminals, for detecting a failure in a network in which each terminal is connected to another terminal via at least one relay unit among a plurality of relay units, the network failure detection apparatus includes: a communication section acquiring, from a first relay unit among the plurality of relay units, statistic information related to data received in each of a plurality of ports of the first relay unit; and based on the statistic information, a decision section deciding whether or not a loop causing a predetermined network failure is occurred in the first relay unit, or deciding the direction from the first relay unit to another relay unit having the loop occurred therein.

As a second configuration of the network failure detection apparatus according to the present invention, in the above first configuration, the statistic information is a received data amount, or the number of received data, on a port-by-port basis of the first relay unit.

As a third configuration of the network failure detection apparatus according to the present invention, in the above second configuration, when the number of ports each having the received data amount, or the number of received data, per unit time being no less than a predetermined threshold is two, the decision section decides that the loop is occurred in the first relay unit, while when the number of ports each having the received data amount per unit time being no less than the predetermined threshold is one, the decision section decides that another relay unit having the loop occurred therein exists in the downstream direction of the port.

As a fourth configuration of the network failure detection apparatus according to the present invention, in the above third configuration, the threshold is set based on the received data amount, or the number of received data, per unit time in the network failure detection apparatus.

As a fifth configuration of the network failure detection apparatus according to the present invention, in the above third configuration, the threshold is set based on the maximum value of the received data amount, or the number of received data, per unit time in each port of the first relay unit.

As a sixth configuration of the network failure detection apparatus according to the present invention, in the above first configuration, prior to the acquisition of the statistic information, the communication section performs broadcast transmission of a plurality of predetermined request data each having a predetermined data length, and the predetermined data length is longer than the data length of each response data in response to the predetermined request data.

As a seventh configuration of the network failure detection apparatus according to the present invention, in the above first configuration, the communication section acquires statistic information in regard to the data respectively received in the plurality of ports of interface type related to the loop, among the entire ports of the first relay unit.

As an eighth configuration of the network failure detection apparatus according to the present invention, in the above first configuration, the communication section transmits a request for blocking to each port having the received data amount per unit time being no less than the predetermined threshold in the first relay unit.

As a ninth configuration of the network failure detection apparatus according to the present invention, in the above first configuration, the network failure detection apparatus further includes a communication restoration processor performing broadcast transmission of a plurality of data each having a source address other than the address of the network failure detection apparatus, and the communication restoration processor performs broadcast transmission of the plurality of data before the communication section acquires the statistic information.

As a tenth configuration of the network failure detection apparatus according to the present invention, in the above first configuration, the network failure detection apparatus further includes a load reduction processor performing broadcast transmission of a plurality of data each having a data length longer than the data length of the data circulating in the loop at the time the loop is occurred, and the load reduction processor performs broadcast transmission of the plurality of data before the communication section acquires the statistic information.

As an eleventh configuration of the network failure detection apparatus according to the present invention, in the above first configuration, the network failure is a layer 2 loop failure in which data circulating in the loop continue to be transmitted from the loop in a broadcast form.

According to the present invention, as a first network failure detection method being performed in a first terminal among a plurality of terminals, for detecting a failure in a network in which each terminal is connected to another terminal via at least one relay unit among a plurality of relay units, the network failure detection method includes: an acquisition step for acquiring, from a first relay unit among the plurality of relay units, statistic information related to the data received in each of a plurality of ports of the first relay unit; and based on the statistic information, a decision step for deciding whether or not a loop causing a predetermined network failure is occurred in the first relay unit, or deciding the direction from the first relay unit to another relay unit having the loop occurred therein.

As a second network failure detection method according to the present invention, in the above first method, the statistic information is a received data amount, or the number of received data, on a port-by-port basis of the first relay unit.

As a third network failure detection method according to the present invention, in the above second method, when the number of ports each having the received data amount, or the number of received data, per unit time being no less than a predetermined threshold is two, the decision step decides that the loop is occurred in the first relay unit, while when the number of ports each having the received data amount per unit time being no less than the predetermined threshold is one, the decision step decides that another relay unit having the loop occurred therein exists in the downstream direction of the port.

As a fourth network failure detection method according to the present invention, in the above third network failure detection method, the network failure detection method further includes a setting step for setting the threshold based on the received data amount, or the number of received data, per unit time in the network failure detection apparatus, prior to the acquisition step.

As a fifth network failure detection method according to the present invention, in the above third method, the network failure detection method further includes a setting step for setting the threshold, based on the maximum value of the received data amount, or the number of received data, per unit time in each port of the network failure detection apparatus, acquired in the acquisition step, prior to the decision step.

As a sixth network failure detection method according to the present invention, in the above first method, the network failure detection method further includes a transmission step for performing broadcast transmission of a plurality of predetermined request data each having a predetermined data length, and the predetermined data length is longer than the data length of each response data in response to the predetermined request data, prior to the acquisition step.

As a seventh network failure detection method according to the present invention, in the above first method, the acquisition step acquires statistic information in regard to the data respectively received in the plurality of ports of interface type related to the loop, among the entire ports of the first relay unit.

As an eighth network failure detection method according to the present invention, in the above first method, the network failure detection method further includes a transmission step for transmitting a request for blocking to each port having the received data amount per unit time being no less than the predetermined threshold in the first relay unit.

As a ninth network failure detection method according to the present invention, in the above first method, the network failure detection method further includes a communication restoration step for performing broadcast transmission of a plurality of data each having a source address other than the address of the first terminal, prior to the acquisition step.

As a tenth network failure detection method according to the present invention, in the above first method, the network failure detection method further includes a load reduction step performing broadcast transmission of a plurality of data each having a data length longer than the data length of the data circulating in the loop at the time the loop is occurred, prior to the acquisition step.

As an eleventh network failure detection method according to the present invention, in the above first method, the network failure is a layer 2 loop failure in which data circulating in the loop continue to be transmitted from the loop in a broadcast form.

According to the present invention, it is possible to detect the occurrence of a loop causing a trouble in a network, and the point of occurrence of the loop.

Further, the loop can be detected through the processing in the terminal constituting the network, without requiring processing in relay unit constituting the network. Namely, although implementation of a new function in the relay unit requires a relatively large amount of work and time, the present invention does not require such implementation. The processing is performed in the terminal of which function can easily be added merely by installing an application program. Therefore, by installing the application program enabling the processing according to the present invention in the terminal, and through the execution of the application program, the present invention can be implemented for wide use easily and simply.

Further scopes and features of the present invention will become more apparent by the following description of the embodiments with the accompanied drawings.

BRIEF DESCRIPTION OF THE DRAWINGS

FIG. 7 shows an explanation diagram of the processing according to a first exemplary embodiment of the present invention.

FIG. 8 shows an explanation diagram of the processing according to a first exemplary embodiment of the present invention.

FIG. 10 shows a diagram illustrating a second method for dynamically setting a threshold.

FIG. 11 shows a diagram illustrating a second method for dynamically setting a threshold.

FIG. 13 shows an explanation diagram of the processing according to a second exemplary embodiment of the present invention.

FIG. 14 shows an explanation diagram of the processing according to a second exemplary embodiment of the present invention.

FIGS. 17A, 17B show explanation diagrams of the processing for extracting a port related to an L2 loop from a port in a switch of search object.

FIG. 18 shows a processing flowchart for acquiring an address of a switch of search object.

DETAILED DESCRIPTION OF THE INVENTION

The preferred embodiment of the present invention is described hereinafter referring to the charts and drawings. However, it is noted that the scope of the present invention is not limited to the embodiments described below.

On the occurrence of a layer 2 (L2) loop, which is a network failure, a broadcast packet transmitted from inside the same network (subnet) reaches a relay unit forming the L2 loop. Each time the broadcast packet is circulated in the loop, the broadcast packet is transmitted to the entire area of the same subnet. The circulation of the broadcast packet in the loop is performed at a wire speed, and as a result, the broadcast packets are transmitted from the relay unit forming the loop to the same subnet at a wire speed. When attention is paid to the above loop traffic, at the time of the occurrence of the L2 loop, the relay unit forming the loop receives a large amount of packets from one port located in a certain direction. Particularly in the relay unit forming the loop, because loops circulating in both clockwise and counterclockwise directions are existent, a large amount of packets are received in two ports.

Therefore, by acquiring packet reception statistic information on a port-by-port basis of a relay unit, and extracting a port having a large amount of packets received per unit time, it becomes possible to identify the loop point, or an area of the loop point. More specifically, when there is one port having a large reception amount in a certain relay unit, it is possible to determine that an L2 loop is occurred in the downstream direction of the port concerned. Also, when there are two ports each having a large reception amount in a certain relay unit, it is possible to determine that a loop is formed at the two ports concerned, producing an L2 loop.

Figure 1:
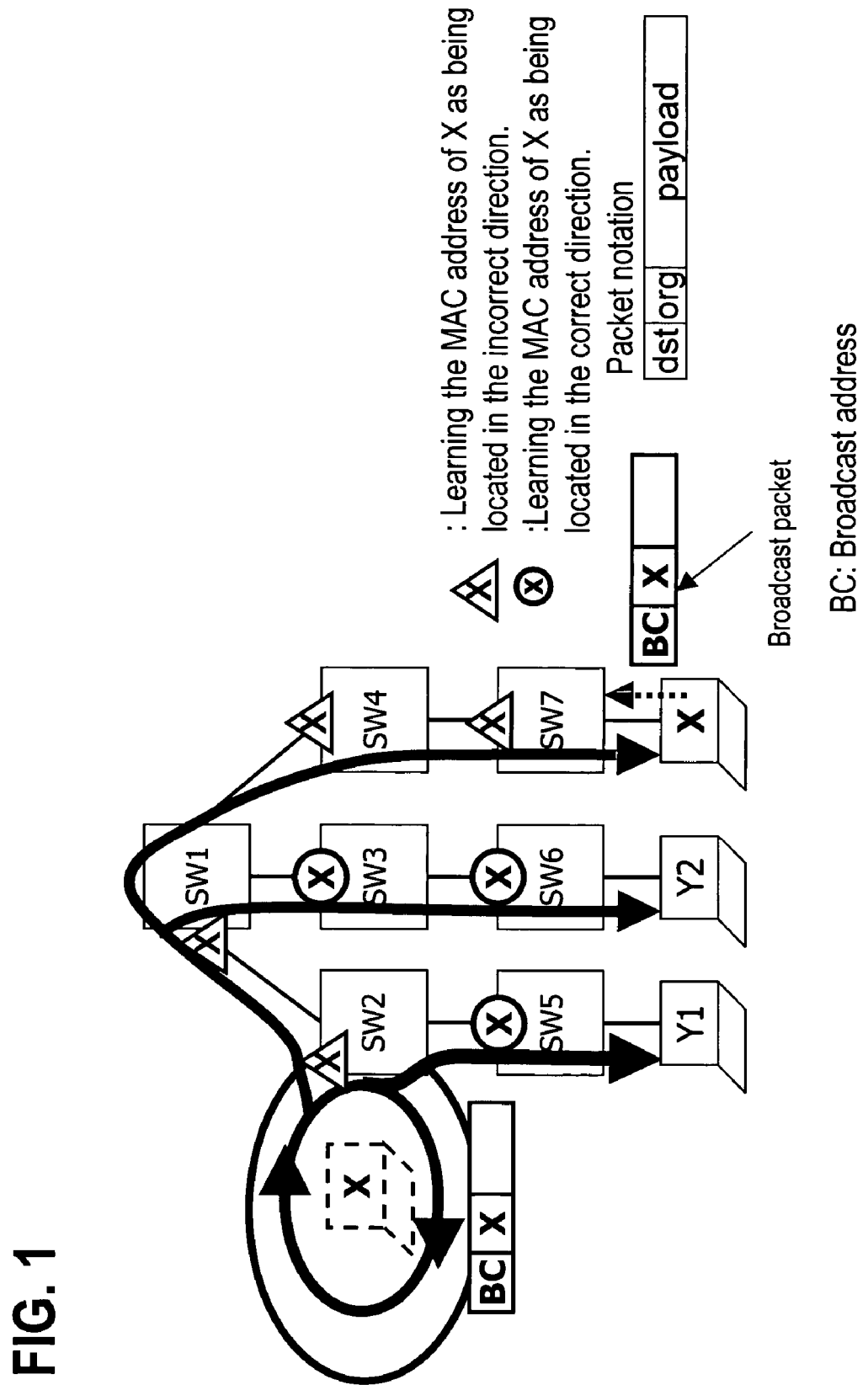
FIG. 1 shows an explanation diagram of a network failure caused by a layer 2 loop.
Figure 2:
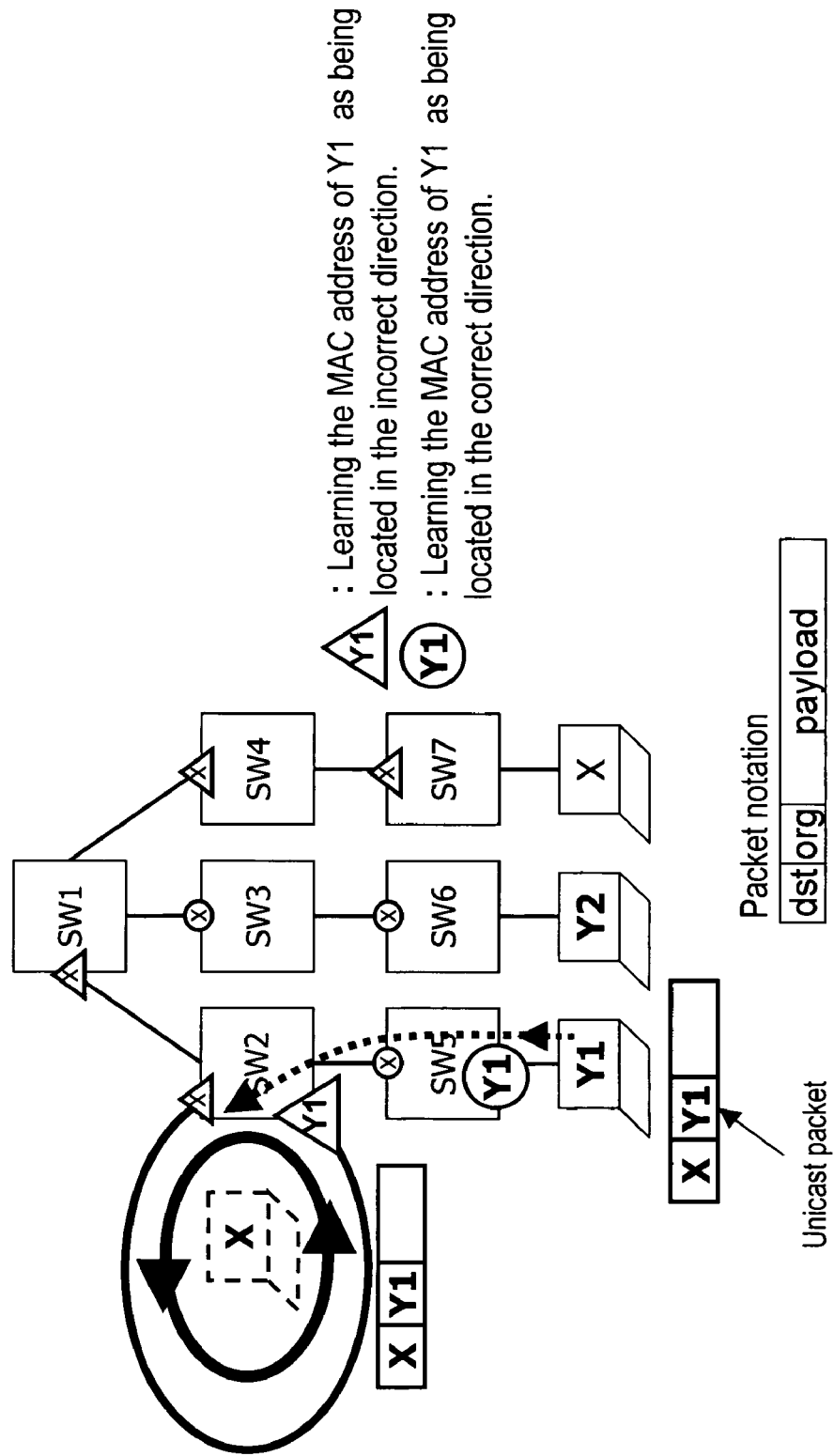
FIG. 2 shows an explanation diagram of a network failure caused by a layer 2 loop.
Figure 3:
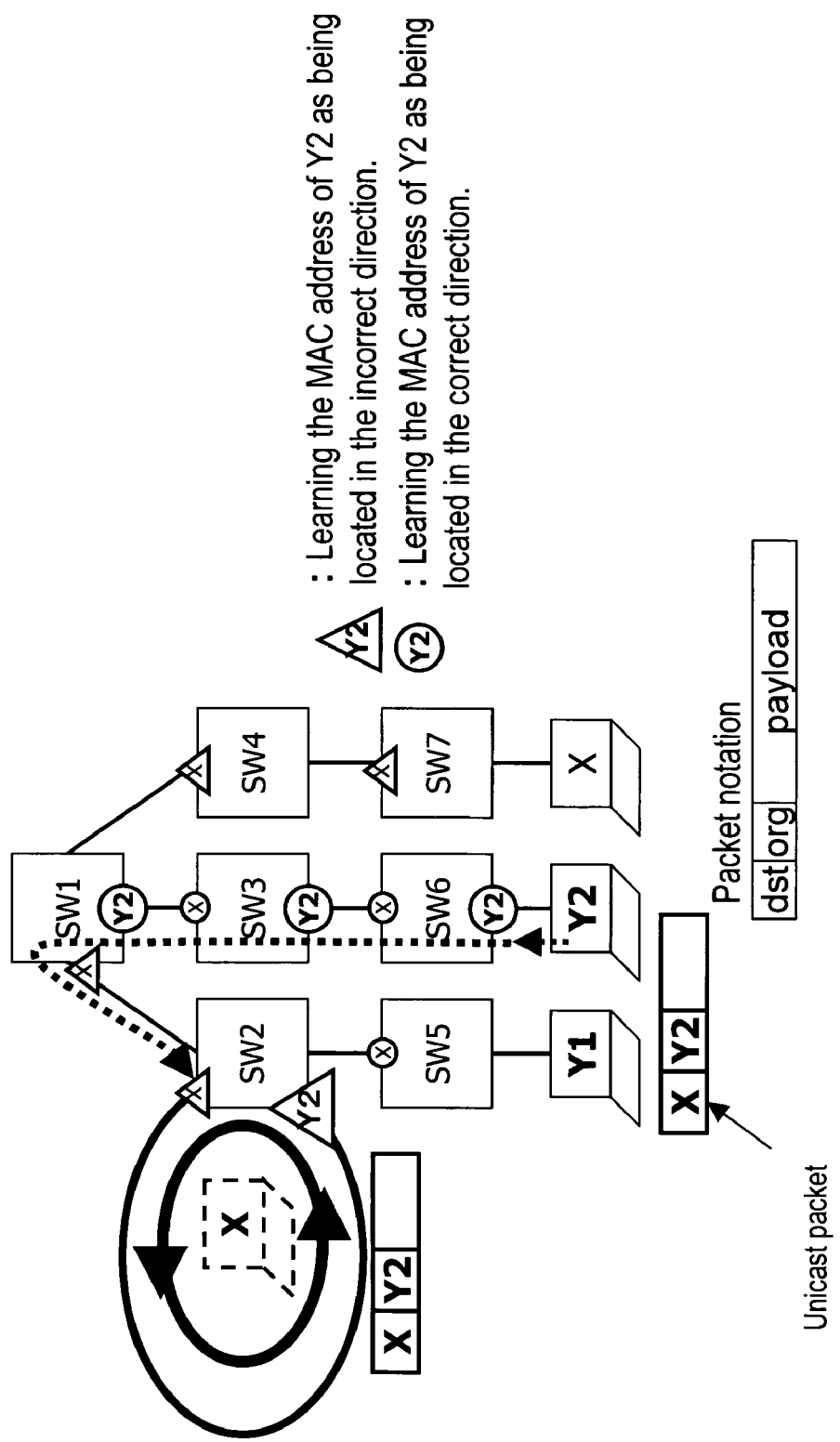
FIG. 3 shows an explanation diagram of a network failure caused by a layer 2 loop.
Figure 4:
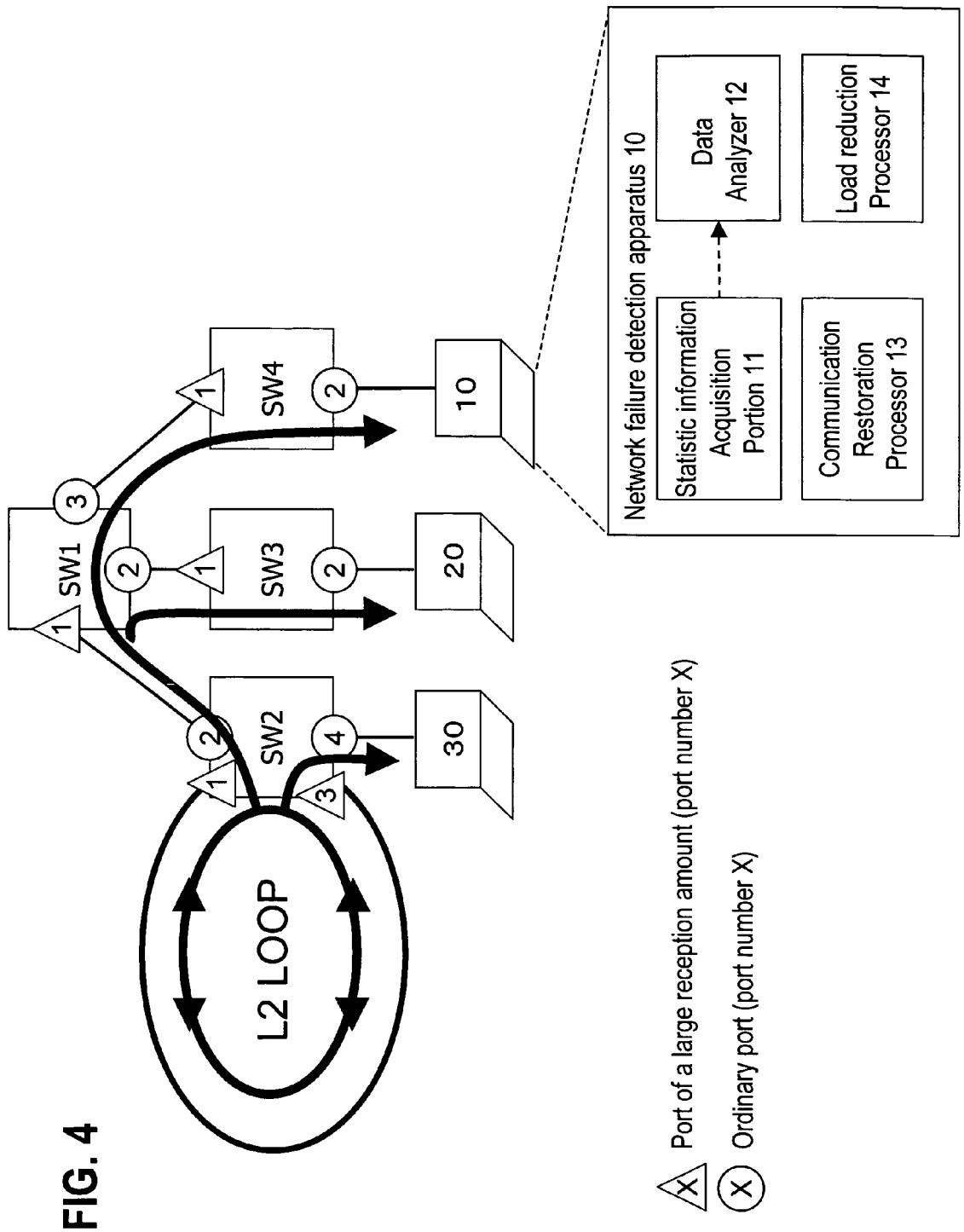
FIG. 4 shows a configuration diagram illustrating the principle of a network failure detection apparatus according to an embodiment of the present invention.

FIG. 4 shows a principle configuration diagram of a network failure detection apparatus according to an embodiment of the present invention. In FIG. 4, a network is structured of switches SW2, SW3 and SW4, which are connected in subordination to a layer-2 switch SW1, and terminals 10, 20 and 30 being respectively connected to the switches SW2, SW3 and SW4. Terminal 10 is a network failure detection apparatus, which includes a statistic information acquisition section 11, a data analyzer 12, a communication restoration processor 13, and a load reduction processor 14, so as to function as network failure detection apparatus. The processing performed in communication restoration processor 13 and load reduction processor 14 will be described later. In the example shown in FIG. 4, an L2 loop is occurred at port 1 and port 3 in the switch SW2; broadcast packets continue to be transmitted from the L2 loop at a wire speed; in the switch SW2, port 1 and port 3 become ports having a large reception amount; in the switches SW1, SW3 and SW4, each port 1 located in the direction of the switch SW2 becomes a port of a large reception amount. Namely, there is one port having a large reception amount in the SW1, SW3 or SW4, while there are two ports of a large reception amount in the switch SW2.

Figure 5:
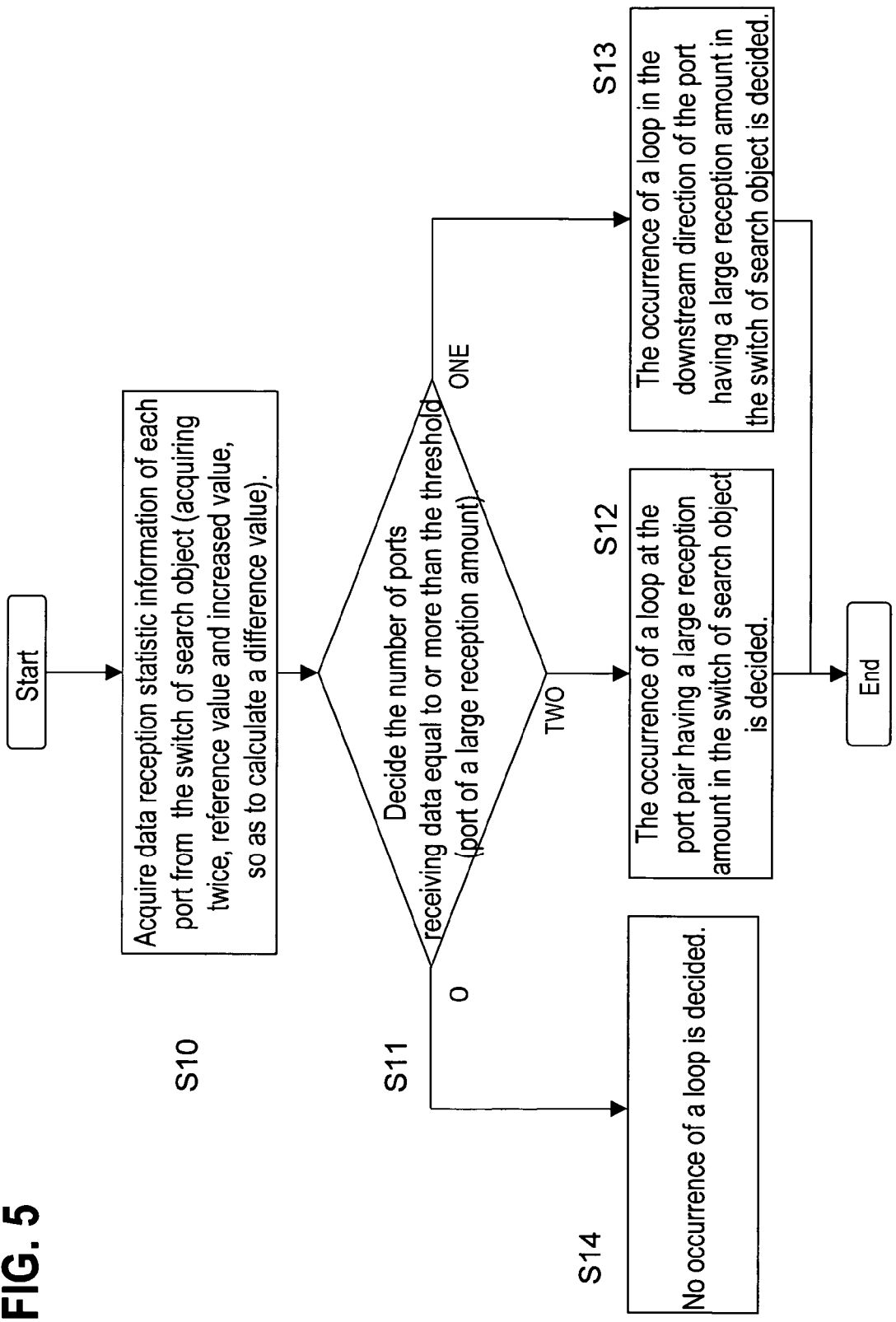
FIG. 5 shows a general processing flowchart in a network failure detection apparatus according to an embodiment of the present invention.

FIG. 5 shows a general processing flowchart of the network failure detection apparatus according to the embodiment of the present invention. Statistic information acquisition section 11 in network failure detection apparatus 10 is a communication means having a transmission/reception function of packets (data), which transmits a statistic information request, requesting a switch of search object to transmit the packet reception statistic information of each port, and acquires statistic information (information of the number of packet reception) which is a response from the switch of search object (S10). At this time, statistic information acquisition section 11 acquires two sets of statistic information at different times. By calculating the difference between the above two information sets, statistic information acquisition section 11 obtains the number of packets received per unit time in each port.

Data analyzer 12 compares the number of packets received in each port per unit time decides the number of ports which receives packets of which number is a predetermined threshold or more (S11). Then, in case the number of ports satisfying the above decision is two, it is decided that an L2 loop is occurred in the switch of search object (S12), while in case the number of ports satisfying the above decision is one, it is decided that an L2 loop is occurred in the further downstream direction of the switch of search object (S13). Further, according to the present invention, in case the number of ports corresponding to the above decision is zero, it is decided no L2 loop is occurred (S14). According to the embodiment of the present invention, it is assumed that one L2 loop occurs in the network (subnet). In such a case, the upper limit of the number of ports that receives packets of no less than the threshold is two. Since the possibility that a plurality of L2 loops are occurred in a single subnet is extremely low, in the L2 loop detection processing, it is not necessary to take into consideration a case of the plurality of L2 loops being occurred.

Additionally, the statistic information is a management information database (MIB) of each switch, which is retained in each switch. MIB is information indicating each state of a network apparatus (including each switch and each terminal in the embodiment of the present invention) to be managed by SNMP (Simple Network Management Protocol), which includes the number of packets received in each port. MIB is defined in RFC 1156 and RFC 1213 (RFC: Request for comments by the IETF, Internet Engineering Task Force). Hereafter, the embodiment of the present invention will be described in more detail.

Figure 6:
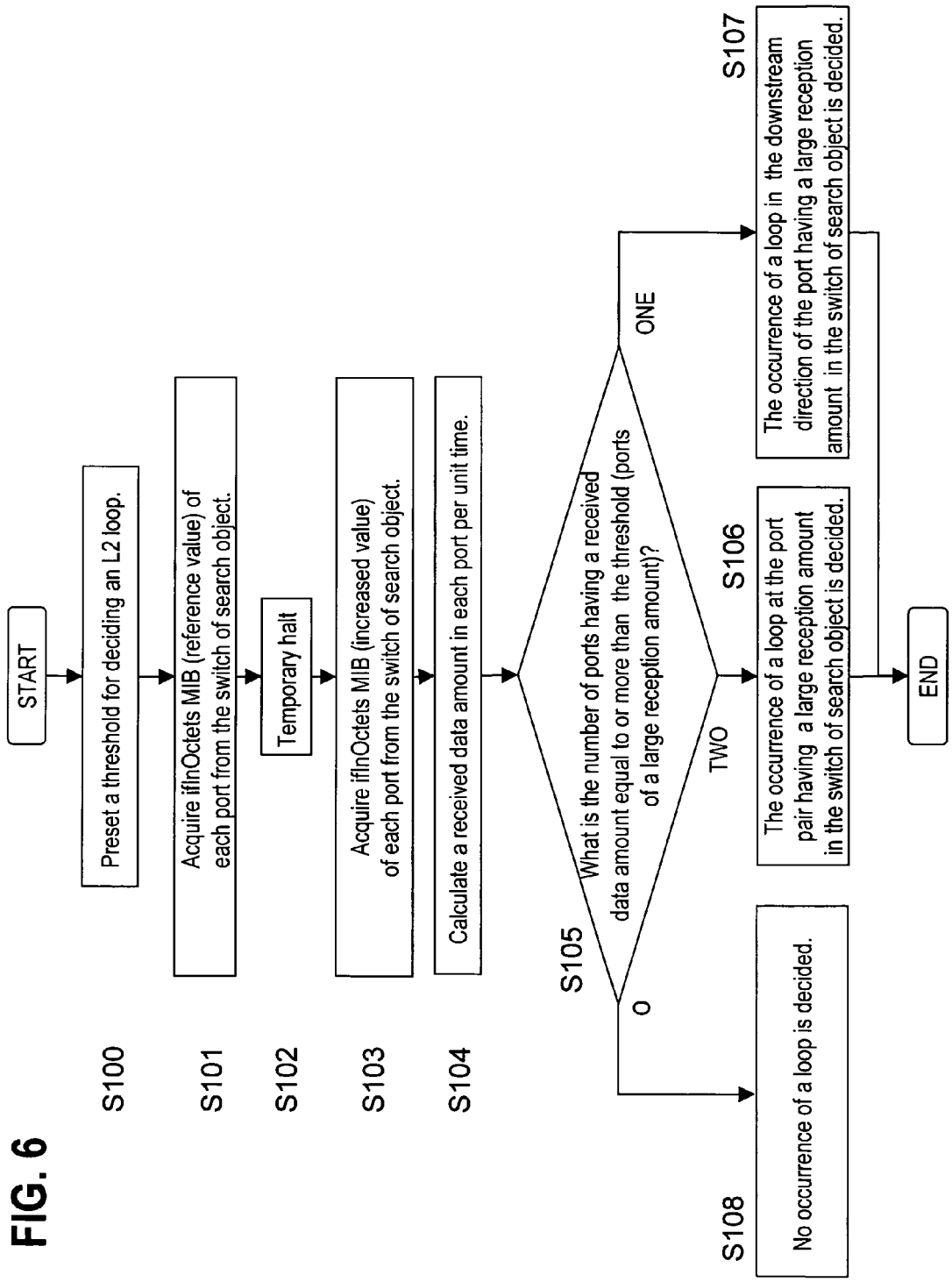
FIG. 6 shows a processing flowchart in a network failure detection apparatus according to a first exemplary embodiment of the present invention.

FIG. 6 shows a processing flowchart in a network failure detection apparatus according to a first exemplary embodiment of the present invention. In this first exemplary embodiment, a data amount received in each port is compared with a preset threshold. Based on the number of ports of which data amount is no less than the threshold, the occurrence of an L2 loop and the point of occurrence are detected.

In step S100, the threshold of the data amount for determining a large amount of packet reception is set in advance. Statistic information acquisition section 11 requests the switch of search object to transmit statistic information including the amount of data received in each port. In response to the above request, the switch of search object transmits the statistic information including a received data amount in each port. Statistic information acquisition section 11 then acquires the above statistic information (S101). The statistic information including the received data amount in each port is ifInOctets MIB.

When a predetermined time (for example, 1 second) elapses after the statistic information for the first time is acquired (S102), statistic information acquisition section 11 again requests the switch of search object to transmit the statistic information including a received data amount in each port. In response to the request, the switch of search object transmits the statistic information (ifInOctets MIB) including the received data amount in each port for the second time, and statistic information acquisition section 11 acquires the above statistic information (S103).

By subtracting the statistic information for the first time (reference value) from the statistic information for the second time (increased value), data analyzer 12 calculates the received data amount per unit time in each port (S104) Since the statistic information denotes a data amount at a certain time, by calculating the difference between the two statistic information sets of different times, a received data amount per unit time can be obtained.

Data analyzer 12 compares the received data amount per unit time in each port with the threshold set in step S100, and decides the number of ports which receive a data amount of no less than the threshold (S105). When the number of ports satisfying the above decision is one, it is decided that an L2 loop is existent in the downstream direction of the port concerned in the switch of search object (S106). When the number of ports satisfying the above decision is two, it is decided that an L2 loop is occurred in the related port pair of the switch of search object (S107). Also, when the number of ports satisfying the above decision is zero, it is decided that no L2 loop is occurred (S108).

FIGS. 7 and 8 show explanation diagrams of the processing of the first example of the embodiment of the present invention. FIG. 7 shows an example such that network failure detection apparatus 10 acquires the statistic information of the switch SW1, while FIG. 8 shows an example such that network failure detection apparatus 10 acquires the statistic information of the switch SW2. The threshold for deciding the existence or nonexistence of an L2 loop is set to 80 Mbps, respectively.

In FIG. 7, the statistic information for the first time (reference value) in each port 1, 2, 3 of the switch SW1 and the statistic information for the second time (increased value) are acquired, and the difference value therebetween and the received data amount per unit time are calculated. As is apparent from FIG. 7, the number of ports having the received data amount exceeding the threshold is one, and the port concerned is port 1. Accordingly, it is decided that an L2 loop is occurred in the downstream direction of port 1 of the switch SW1 from the network failure detection apparatus 10 side.

In FIG. 8, similarly, the statistic information for the first time (reference value) in each port 1, 2, 3 of the switch SW2 and the statistic information for the second time (increased value) are acquired. Then, the difference value therebetween and the received data amount per unit time are calculated. As shown in FIG. 8, the number of ports having the received data amount exceeding the threshold is two, and the ports concerned are port 1 and port 3. Accordingly, it is decided that the L2 loop is occurred at port 1 and port 3 of the switch SW2.

The threshold value may be set in advance, as shown in step S100 of FIG. 6. It may also be possible to set the threshold value dynamically, according to a network communication condition.

Figure 9:
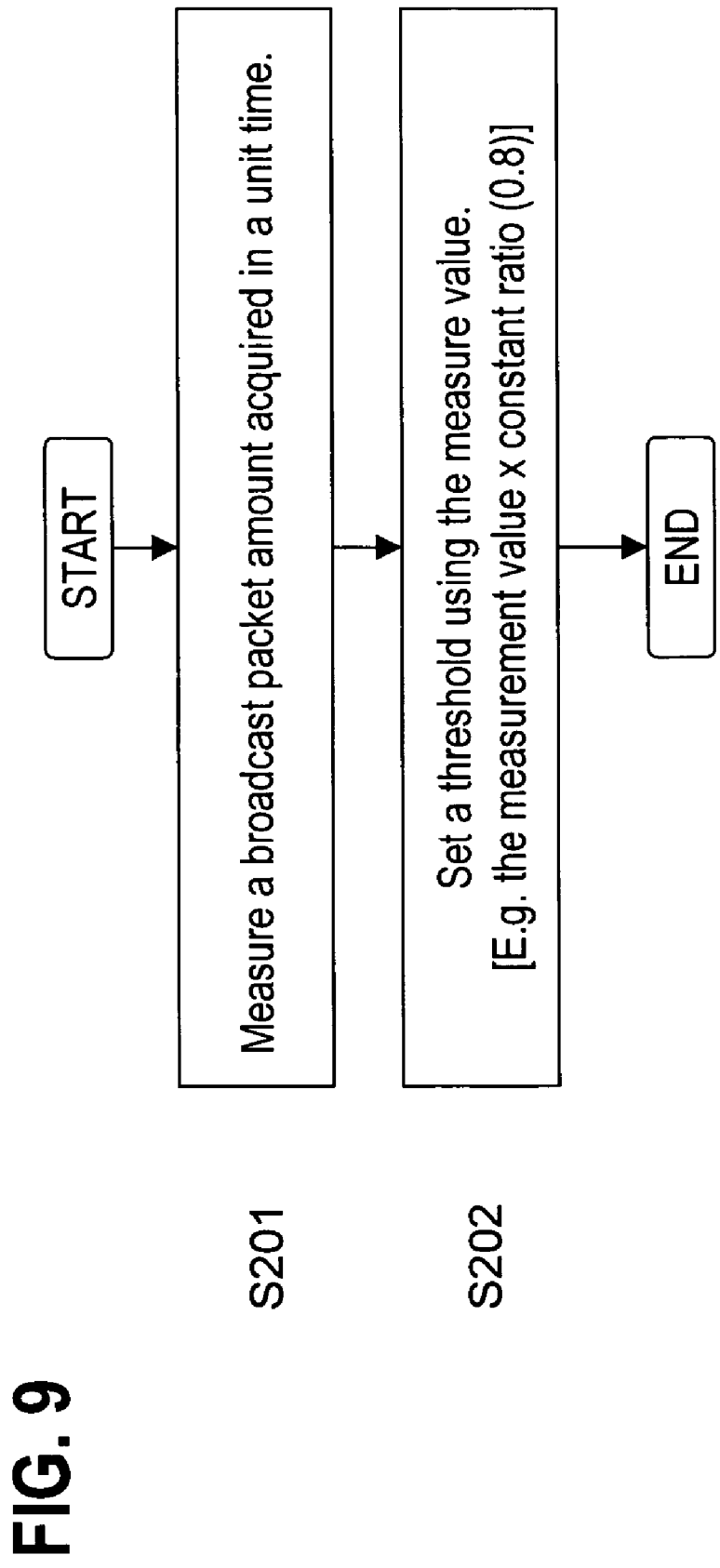
FIG. 9 shows a flowchart illustrating a first method for dynamically setting a threshold.

FIG. 9 shows a flowchart illustrating a first method for dynamically setting the threshold. Network failure detection apparatus 10 counts the data amount of the broadcast packets received by the self-apparatus, and measures the received data amount per unit time (S201) Then, network failure detection apparatus 10 sets the threshold based on the calculated data amount (S202). For example, as a threshold, a value of the received data amount per unit time multiplied by a constant multiplying factor is set. More specifically, assuming that the calculated received data amount per unit time is 95 Mbps, and the constant multiplying factor is 0.8, then the threshold becomes 76 Mbps.

FIGS. 10, 11 show diagrams illustrating a second method for dynamically setting the threshold. In this second method, as threshold, the maximum of the received data amount (or the number of received packets) in each port included in the acquired statistic information being multiplied by a constant multiplying factor is set. FIG. 10 shows a table indicating the statistic information of the switch SW1, and the received data amount per unit time in each port being calculated from the above statistic information. As shown in FIG. 10, the maximum value of the received data amount per unit time is 96 Mbps, which is obtained in port 1. Under the assumption of the constant multiplying factor of 0.8, the threshold becomes 76.8 Mbps. In the switch SW1, the port having a received data amount exceeding the threshold 76.8 Mbps is only port 1, which is the same decision result as in FIG. 7.

As the threshold obtained by multiplying a constant multiplying factor, it may also be possible to set a lower limit value. The reason is that there is a possible case such that no port is considered to be a port having a large reception amount. When the calculated threshold falls below the lower limit value, the lower limit value is set as threshold. In the examples shown in FIGS. 10, 11, the lower limit value is, for example, 8 Mbps.

FIG. 11 shows a table indicating the statistic information of the switch SW2, and the received data amount per unit time in each port being calculated from the above statistic information. As shown in FIG. 11, the maximum value of the received data amount per unit time is 96 Mbps, which is obtained in port 1. Under the assumption of the constant multiplying factor of 0.8, the threshold becomes 76.8 Mbps. In the switch SW2, the ports having a received data amount exceeding the threshold 76.8 Mbps are port 1 and port 3, which is the same decision result as in FIG. 8.

Figure 12:
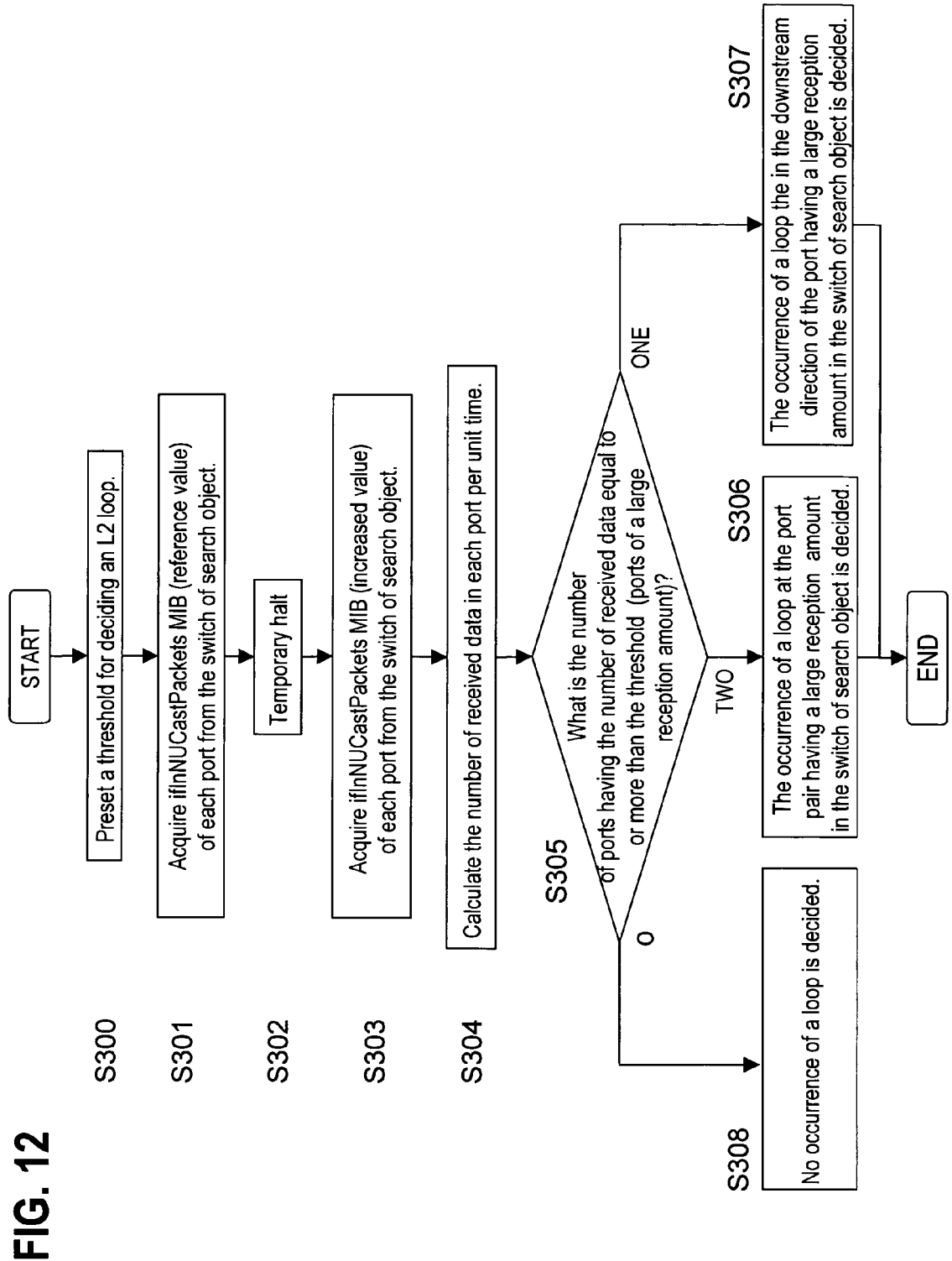
FIG. 12 shows a processing flowchart of a network failure detection apparatus according to a second exemplary embodiment of the present invention.

FIG. 12 shows a processing flowchart of the network failure detection apparatus according to a second exemplary embodiment of the present invention. In this second embodiment, in place of the data amount used in the first embodiment, the number of packets received in each port is compared with a preset threshold, and based on the number of ports in which the number of packets is no less than the threshold, the occurrence of an L2 loop and the point of occurrence are detected.

In step S300, the threshold of the number of received packets for determining a large amount of packet reception is set in advance. Statistic information acquisition section 11 requests the switch of search object to transmit statistic information including the number of packets received in each port. In response to the above request, the switch of search object transmits the statistic information including the number of packets received in each port. Statistic information acquisition section 11 then acquires the above statistic information (S301). The statistic information including the number of packets received in each port is ifInNUCastPackets MIB.

When a predetermined time (for example, 1 second) elapses after the statistic information for the first time is acquired (S302), statistic information acquisition section 11 again requests the switch of search object to transmit the statistic information including the number of packets received in each port. In response to the request, the switch of search object transmits the statistic information (ifInNUCastPackets MIB) including the number of packets received in each port for the second time, and statistic information acquisition section 11 acquires the above statistic information (S303).

By subtracting the statistic information for the first time (reference value) from the statistic information for the second time (increased value), data analyzer 12 calculates the number of packets received per unit time in each port (S304). Since the statistic information denotes the number of received packets at a certain time, by calculating the difference between the two statistic information sets of different times, the number of received packets per unit time can be obtained.

Data analyzer 12 compares the number of received packets per unit time in each port with the threshold set in step S300, and decides the number of ports which receive the number of packets of no less than the threshold (S305). When the number of ports satisfying the above decision is one, it is decided that an L2 loop is existent in the downstream direction of the port concerned in the switch of search object (S306). When the number of ports satisfying the above decision is two, it is decided that an L2 loop is occurred in the port pair concerned of the switch of search object (S307). Also, when the number of ports satisfying the above decision is zero, it is decided that no L2 loop is occurred (S308).

FIGS. 13 and 14 show explanation diagrams of the processing of the second example of the embodiment of the present invention. FIG. 13 shows an example such that network failure detection apparatus 10 acquires the statistic information of the switch SW1, while FIG. 14 shows an example such that network failure detection apparatus 10 acquires the statistic information of the switch SW2. The threshold for deciding the existence or nonexistence of an L2 loop is set to 8,000 pps (packets per second), respectively.

In FIG. 13, the statistic information for the first time (reference value) in each port 1, 2, 3 of the switch SW1 and the statistic information for the second time (increased value) are acquired, and the difference value therebetween and the number of received packets per unit time are calculated. As shown in FIG. 13, the number of ports having the number of received packets exceeding the threshold is one, and the port concerned is port 1. Accordingly, it is decided that an L2 loop is occurred in the downstream direction of port 1 of the switch SW1 from the network failure detection apparatus 10 side.

In FIG. 14, similarly, the statistic information for the first time (reference value) in each port 1, 2, 3 of the switch SW2 and the statistic information for the second time (increased value) are acquired, and the difference value therebetween and the number of received packets per unit time are calculated. As shown in FIG. 14, the number of ports having the number of received packets exceeding the threshold is two, and the ports concerned are port 1 and port 3. Accordingly, it is decided that an L2 loop is occurred at port 1 and port 3 of the switch SW2.

In the second embodiment also, the threshold value may be set dynamically according to a network communication condition, as shown in FIG. 9 and FIG. 10 (or FIG. 11). For example, assuming that the calculated number of received packets per unit time is 12,000 pps, and the constant multiplying factor is 0.8, the threshold becomes 9,600 pps. Or, it is also possible to calculate the threshold by multiplying a constant multiplying factor by the maximum value among the number of received packets in the respective ports.

Now, in case an L2 loop is occurred and a large amount of broadcast packets are transmitted from the L2 loop, when the broadcast packet is a packet requesting a response from the destination, possibly a large amount of response packets in response to the broadcast packet are transmitted in the direction opposite to the forwarding direction of the broadcast packet. Then, in addition to the port receiving the broadcast packet from the L2 loop, the port receiving the response packets also receives a large amount of packets. For this reason, it is not possible to identify the point of occurrence of the L2 loop, nor the direction of occurrence.

To avoid the above problem, for example, network failure detection apparatus 10 transmits in advance a large amount of broadcast requests each having a large packet size. Here, the broadcast packet is selected and transmitted so that the size of the response packet to the broadcast request is sufficiently smaller than the packet size of the broadcast request.

Figure 15:
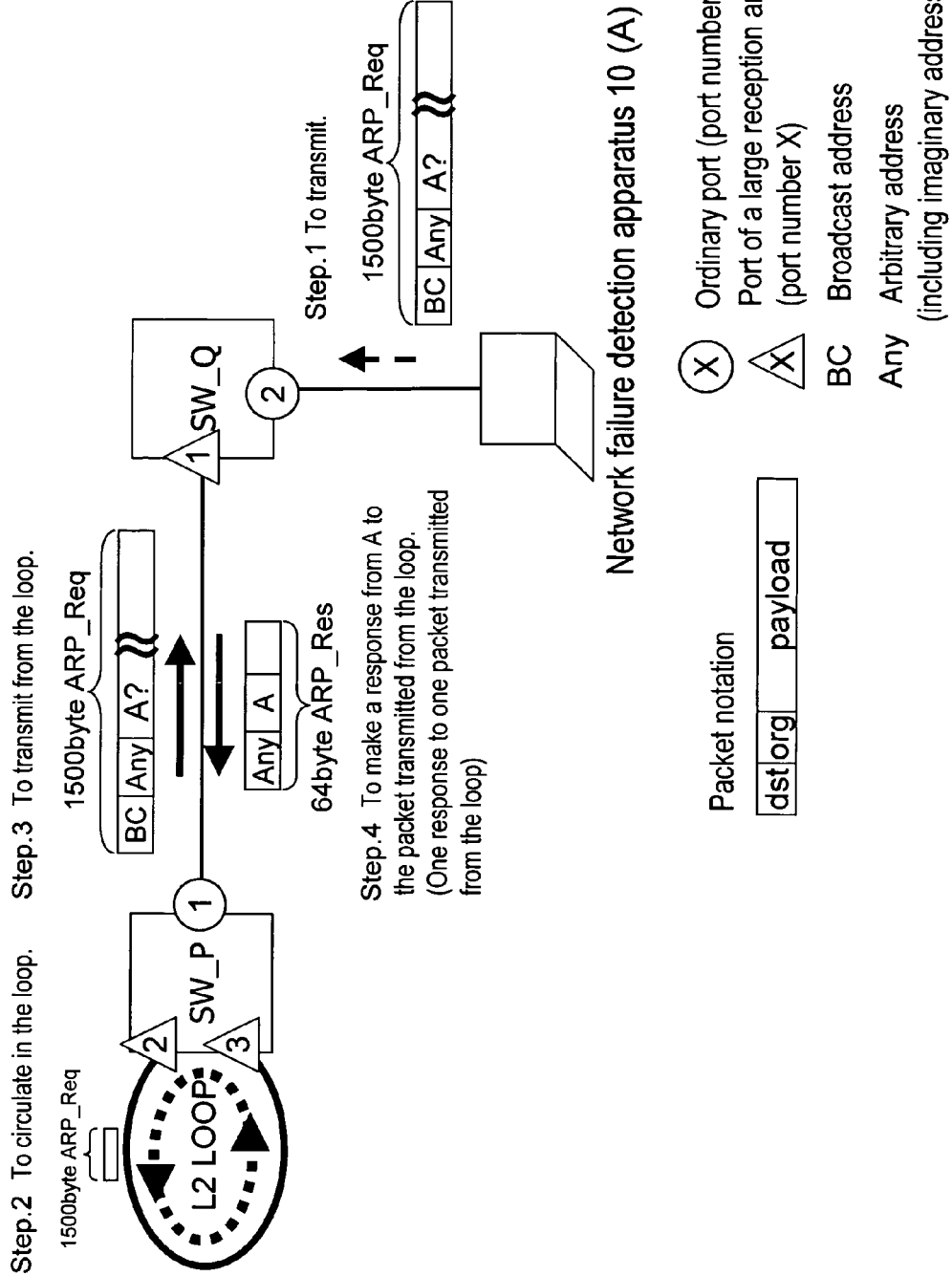
FIG. 15 shows an explanation diagram illustrating an example of transmitting a broadcast request having a large packet size.

FIG. 15 shows an explanation diagram illustrating an example of transmitting a broadcast request having a large packet size. Network failure detection apparatus 10 having a given address 'A' transmits a large amount (for example, 1,000) of broadcast ARP (Address Resolution Protocol) requests for resolving the own address 'A' with a long size (for example, 1,500 bytes), including the source address 'Any' (indicating an arbitrary address, which may include an non-existent imaginary address) (Step 1). The ARP request reaches the L2 loop, and continues to circulate (Step 2). The ARP request is forwarded from the L2 loop (Step 3), and then is returned to network failure detection apparatus 10. In response to the ARP request, network failure detection apparatus 10 performs unicast transmission of an ARP response destined to the address 'Any', because the received ARP request is the packet requesting for resolution of the own address (Step 4). This ARP response is structured of 64 bytes, which is a size 1/20 times as large as the packet size of the ARP request, which is sufficiently small. The ARP response reaches the L2 loop, and circulates therein.

As such, by making the packet size transmitted from the L2 loop sufficiently larger than the packet size destined to the L2 loop, it becomes possible to decide only the port receiving the packets transmitted from the L2 loop, as a port having a large reception amount. In FIG. 15, port 1 of the SW_P is a port having a large reception amount of ARP responses. However, since the size of each ARP response is sufficiently small, the port is not decided as a port having a large reception amount. Meanwhile, since port 1 of the switch SW_Q is a port having a large reception amount of ARP requests of large packet sizes, port 1 is decided as the port having a large reception amount.

It is also possible that the network failure detection apparatus acquires in advance the interface of each port in the switch of search object, and determines only the port of the interface related to the L2 loop as search object. The L2 loop is a failure which can be identified in the Ethernet (Registered Trademark). The network failure detection apparatus acquires statistic information only from the port of the interface related to the Ethernet (Registered Trademark).

Figure 16:
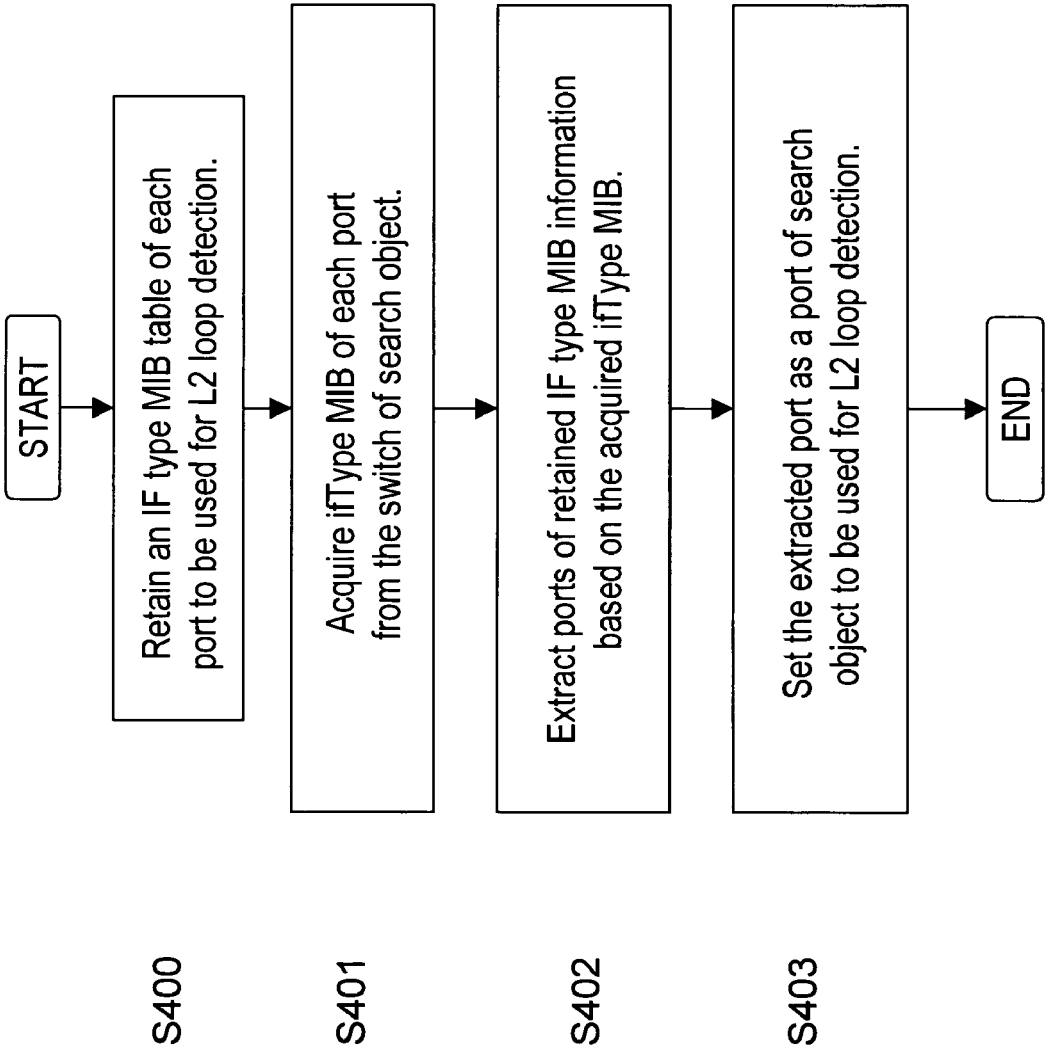
FIG. 16 shows a flowchart of the processing for extracting a port related to an L2 loop from a port in a switch of search object.

FIG. 16 shows a flowchart of the processing for extracting a port related to the L2 loop from a port in the switch of search object. Also, FIG. 17 shows a diagram illustrating the processing concerned. Network failure detection apparatus retains in advance a table having the interface (IF) type information of a port to be used for the L2 loop detection (S400). FIG. 17A is an example of the IF type table. The IF type table includes interface type information related to the Ethernet (Registered Trademark).

Network failure detection apparatus 10 transmits interface notification request of each port to the switch of search object, and acquires interface type information of each port in advance from the switch of search object (S401). FIG. 17B shows an example of the acquired interface type information of each port (of which number is 1 to 10), in which ports 1-6 are fastEther, ports 7-8 are gigabit Ethernet (Registered Trademark), and ports 9-10 are ATM (Asynchronous Transfer Mode). The interface type information of each port transmitted from the switch of search object is, for example, ifType MIB. Based on the acquired interface type information, network failure detection apparatus 10 extracts a port having the interface type included in the above-mentioned IF type table (S402), and sets the above extracted port to be a port of search object in the switch of search object (S403). In the example shown in FIG. 17B, ports 1-8 are set to be the ports of search object.

When the switch forming the L2 loop is identified through the aforementioned embodiment, further, it may also be possible to perform the processing for evading the L2 loop concerned. In the example shown in FIG. 4, the network failure detection apparatus transmits to the switch SW2 a command to block the port against either port 1 or port 3 in the switch SW2. The command is, for example, an SNMPset command for making ifAdminStatus MIB of port 1 or port 3 down. With this, not only detecting the point of occurrence of the L2 loop, evasion of the L2 loop can be achieved. Also, by cutting off the port 1 in switch SW1, it may be possible to evade the L2 loop located downstream the switch SW1. Network failure detection apparatus 10 transmits to the switch SW1 a command for cutting off port 1.

Further, in order to acquire the statistic information from the switch of search object before performing the processing according to the embodiment of the present invention, it is necessary to acquire the address of the switch of search object.

FIG. 18 shows a processing flowchart for acquiring the address of the switch of search object. Network failure detection apparatus 10 transmits an SNMPget command, which is a command for requesting to acquire a predetermined MIB, to the broadcast address in the network of search object (S500). Network failure detection apparatus 10 receives a response packet from a switch which can respond to the above SNMPget command, and extracts the source address from the received response packet (S501). By this, the address of the switch of search object can be acquired. The extracted address is set as the address of the switch of search object (S502).

When the L2 loop is occurred, it is highly probable that a response packet cannot be received from the switches in the network (subnet). Therefore, preferably, the address acquisition processing is performed, for example, when it is apparent that communication in the network is performed normally (when it is apparent that no L2 loop is occurred).

Further, the first three bytes in a switch address (MAC address) denote OUI (Organizationally Unique Identifier) for identifying the vendor of the switch. Accordingly, it may also be possible for the network failure detection apparatus to perform processing in which the vendor property of the switch of search object is taken into consideration.

For example, in case that a switch provided by a certain vender has no statistic information in regard to the number of received packets, but only has statistic information in regard to the received data amount, it is necessary to perform the processing according to the first embodiment using the received data amount. The network failure detection apparatus retains vendor identification information (OUI), and a table for performing the processing corresponding thereto in advance, and performs processing matching the vender property of the switch of search object, based on the vendor identification information.

Now, as explained in the description of the related art, when a broadcast packet is transmitted from a terminal in a state that an L2 loop is occurred, the switches located on the path from the terminal concerned to the point of the occurrence of the L2 loop mislearn the address of the terminal concerned. Accordingly, for example, in a state that the L2 loop is occurred in the switch SW2, when any broadcast packet is transmitted from terminal 10 (network failure detection apparatus), the address of terminal 10 is also mislearned as if the address of terminal 10 is located in the L2 loop direction. Under such circumstances, when the switch of search object transmits statistic information in response to a statistic information request sent from network failure detection apparatus 10, the statistic information is incorrectly transmitted in the direction of being mislearned. As a result, there is a risk that network failure detection apparatus (terminal 10) cannot receive the statistic information.

Accordingly, in the embodiment of the present invention, in order to avoid an inconvenient situation such that the network failure detection apparatus cannot acquire statistic information, communication restoration processor 13 performs processing for restoring communication with the switch of search object (communication restoration processing).

Communication restoration processor 13 in the network failure detection apparatus continuously transmits a plurality of broadcast packets (hereafter referred to as dummy packets) having, as source address, a MAC address other than the MAC address of the self-apparatus. When broadcast transmission of the dummy packets is performed, the packets reach the L2 loop, and start to circulate. Since broadcast packets having already been circulating are input to the input port of the switch SW2 in which the L2 loop is occurred, and also the above dummy packets are input thereto, a state of one-output and two-inputs arises. If the dummy packets are transmitted continuously and in large quantities, the length of an output queue or an input queue exceeds a tolerable value, causing the packets to be discarded. When the dummy packets continue to be transmitted further, a broadcast packet having the network failure detection apparatus as source is successively replaced by the dummy packet. Finally, the broadcast packets in circulation are entirely replaced by the dummy packets. With this, the broadcast packets, each having the network failure detection apparatus as source, are not transmitted any more from the L2 loop, and the mislearning of the addresses of the terminal of search object are cancelled in the entire switches of the network. Thus, communication between the switch of search object and the network failure detection apparatus can be restored.

It is sufficient that the source address of the dummy packet may be a MAC address other than the MAC address of the network failure detection apparatus. Namely, the source address may be either a nonexistent imaginary address or a MAC address of another existing terminal. However, in case of communicating with the above existing terminal, it becomes necessary to perform the above-mentioned communication restoration processing again.

After performing the above-mentioned communication restoration processing, the network failure detection apparatus transmits a statistic information request to the switch of search object, and performs the aforementioned L2 loop detection processing.

Also, as explained in the description of the related art, on the occurrence of the L2 loop, there occurs a broadcast storm phenomenon, in which broadcast packet transmission continues from the switch having the L2 loop, causing the entire terminals in the network to fall into heavy load conditions. When the L2 loop detection processing in accordance with the present embodiment is performed in the heavy load conditions, the processing speeds in both the network failure detection apparatus and the switch of search object are decreased, causing processing delay, or the processing may be halted, and also, possibly the packet transmission speed is decreased.

Since the reception of the broadcast packets produces interruption processing in the terminals and switches of the network, the CPU occupancies thereof become heavy load conditions. This may cause a serious trouble such that no other processing cannot be performed, or the processing speed is decreased. In particular, like the ARP packet, a broadcast packet may often be a packet requiring response from a particular terminal. When a large amount of broadcast packets reach the terminal, requiring a response therefrom, the loads for response processing are added, and heavy load conditions are occurred further.

This produces possible occurrence of delay in the transmission processing of the statistic information to be sent from the switch of search object, in response to the statistic information request. Or, the statistic information may become unable to be transmitted, which causes the network failure detection apparatus becoming unable to normally receive the statistic information.

Therefore, according to the embodiment of the present invention, in order to avoid an inconvenient condition of inability of receiving the statistic information affected by the heavy load, load reduction processor 14 performs processing for reducing the network load (load reduction processing).

The cause of the heavy loads in the network devices (including the terminals and the switches) due to the broadcast storm by the L2 loop is that the number of broadcast packets per unit time becomes so enormous as to approach the limit of the processing capacity of the respective terminals, or even exceeds the limit thereof. By decreasing the number of broadcast packets received per unit time, it becomes possible to reduce the load in each terminal.

For this purpose, load reduction processor 14 in network failure detection apparatus continues to transmit long packets, i.e. packets having a relatively long length, successively, as broadcast packet. In the network, broadcast packets including ARP, RIP and NetBIOS, are continuously transmitted, and accordingly the packets circulated in the L2 loop when the L2 loop is occurred are mostly the above packets. In particular, the ARP packet has a short packet length of the order of 64 bytes, and even the packets of NetBIOS have short packet lengths on the order of 200 bytes. On the occurrence of the L2 loop, the above short packets are broadcasted throughout the entire network area at the speed of the transmission lines forming the L2 loop. For example, when only ARP packets are circulating in an L2 loop of 100 Mbps, theoretically, there are 140 thousand packets per second of broadcast transmission which are transmitted from the L2 loop to the entire network area.

Load reduction processor 14 continuously transmits, for example, long packets of which lengths are on the order of 1,500 bytes. In the L2 loop, since packets of 1,500 bytes are input, as well as packets of approximately 64 bytes, and the packets are continuously input as well, an input queue or an output queue exceeds a tolerable value. Then, short packets having the length of approximately 64 bytes are gradually discarded, and finally the packets having approximately 64 bytes are entirely discarded. Thus, a state of only packets having 1,500 bytes circulated in the loop can be occurred. In the state of circulating only the packets having the lengths of approximately 1,500 bytes, the number of packets of broadcast transmission from the L2 loop becomes 8,000 per second. As compared to the case of 64-byte packets, it becomes possible to reduce the number of received packets per unit time to approximately ½₀. As a result, the load in each terminal can be reduced, and the load condition can be restored to the degree capable of performing the traffic flow confirmation processing.

After performing the aforementioned load reduction processing, the network failure detection apparatus transmits a statistic information request to the switch of search object, and performs the above-mentioned L2 loop detection processing.

Further, in order to perform the above-mentioned communication restoration processing and the load reduction processing simultaneously, broadcast packets (dummy packets) each having, as source address, a MAC address other than the MAC address of the network failure detection apparatus, which is to be used for communication restoration processing, are transmitted continuously in the form of long packets. By this, it becomes possible to perform the load reduction processing simultaneously.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A network failure detection apparatus, a first terminal among a plurality of terminals, for detecting a failure in a network in which each terminal is connected to another terminal via at least one relay unit among a plurality of relay units, said network failure detection apparatus comprising:
    a communication section acquiring statistic information related to data received in each of a plurality of ports of the first relay unit, from a first relay unit among the plurality of relay units; and
    a decision section deciding whether or not a loop causing a predetermined network failure is occurred in the first relay unit, or deciding the direction from the first relay unit to another relay unit having the loop occurred therein, based on the statistic information, wherein
        the statistic information is a received data amount, or the number of received data, on a port-by-port basis of the first relay unit, and
        when the number of ports each having the received data amount, or the number of received data, per unit time being no less than a predetermined threshold is two, the decision section decides that the loop is occurred in the first relay unit, while when the number of ports each having the received data amount per unit time being no less than the predetermined threshold is one, the decision section decides that another relay unit having the loop occurred therein exists in the downstream direction of the port.

2. The network failure detection apparatus according to claim 1,
    wherein the threshold is set based on the received data amount, or the number of received data, per unit time in the network failure detection apparatus.

3. The network failure detection apparatus according to claim 1,
    wherein the threshold is set based on the maximum value of the received data amount, or the number of received data, per unit time in each port of the first relay unit.

4. The network failure detection apparatus according to claim 1,
    wherein, prior to the acquisition of the statistic information, the communication section performs broadcast transmission of a plurality of predetermined request data each having a predetermined data length, and wherein the predetermined data length is longer than the data length of each response data in response to the predetermined request data.

5. The network failure detection apparatus according to claim 1,
    wherein the communication section acquires statistic information in regard to the data respectively received in the plurality of ports of interface type related to the loop, among the entire ports of the first relay unit.

6. The network failure detection apparatus according to claim 1,
    wherein the communication section transmits a request for blocking to each port having the received data amount per unit time being no less than the predetermined threshold in the first relay unit.

7. The network failure detection apparatus according to claim 1, further comprising:

a communication restoration processor performing broadcast transmission of a plurality of data each having a source address other than the address of the network failure detection apparatus,
wherein the communication restoration processor performs broadcast transmission of the plurality of data before the communication section acquires the statistic information.

8. The network failure detection apparatus according to claim 1, further comprising:
a load reduction processor performing broadcast transmission of a plurality of data each having a data length longer than the data length of the data circulating in the loop at the time the loop is occurred,
wherein the load reduction processor performs broadcast transmission of the plurality of data before the communication section acquires the statistic information.

9. The network failure detection apparatus according to claim 1,
wherein the network failure is a layer 2 loop failure in which data circulating in the loop continue to be transmitted from the loop in a broadcast form.

10. A network failure detection method performed in a first terminal among a plurality of terminals, for detecting a failure in a network in which each terminal is connected to another terminal via at least one relay unit among a plurality of relay units, said network failure detection method comprising:
an acquisition step acquiring statistic information related to the data received in each of a plurality of ports of the first relay unit, from a first relay unit among the plurality of relay units; and
a decision step deciding whether or not a loop causing a predetermined network failure is occurred in the first relay unit, or deciding the direction from the first relay unit to another relay unit having the loop occurred therein, based on the statistic information, wherein
the statistic information is a received data amount, or the number of received data, on a port-by-port basis of the first relay unit, and
when the number of ports each having the received data amount, or the number of received data, per unit time being no less than a predetermined threshold is two, the decision step decides that the loop is occurred in the first relay unit, while when the number of ports each having the received data amount per unit time being no less than the predetermined threshold is one, the decision step decides that another relay unit having the loop occurred therein exists in the downstream direction of the port.

11. The network failure detection method according to claim 10, further comprising:
prior to the acquisition step, a transmission step performing broadcast transmission of a plurality of predetermined request data each having a predetermined data length,
wherein the predetermined data length is longer than the data length of each response data in response to the predetermined request data.

12. The network failure detection method according to claim 10,
wherein the acquisition step acquires statistic information in regard to the data respectively received in the plurality of ports of interface type related to the loop, among the entire ports of the first relay unit.

13. The network failure detection method according to claim 10, further comprising:
a transmission step for transmitting a request for blocking to each port having the received data amount per unit time being no less than the predetermined threshold in the first relay unit.

14. The network failure detection method according to claim 10, further comprising:
prior to the acquisition step, a communication restoration step performing broadcast transmission of a plurality of data each having a source address other than the address of the first terminal.

15. The network failure detection method according to claim 10, further comprising:
prior to the acquisition step, a load reduction step performing broadcast transmission of a plurality of data each having a data length longer than the data length of the data circulating in the loop at the time the loop is occurred.

16. The network failure detection method according to claim 10,
wherein the network failure is a layer 2 loop failure in which data circulating in the loop continue to be transmitted from the loop in a broadcast form.

* * * * *